(12) United States Patent
Ramchandani et al.

(10) Patent No.: US 6,259,428 B1
(45) Date of Patent: Jul. 10, 2001

(54) SYSTEM AND METHOD FOR DYNAMICALLY SUBSTITUTING COLORS IN A GRAPHIC IMAGE

(75) Inventors: Mahesh A. Ramchandani, Austin; Jeffrey D. Washington, Round Rock, both of TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/071,318

(22) Filed: May 1, 1998

(51) Int. Cl.$^7$ .................................................... G09G 5/02
(52) U.S. Cl. ........................................................... 345/150
(58) Field of Search ................................... 345/150, 153, 345/431

(56) References Cited

U.S. PATENT DOCUMENTS

| | | | |
|---|---|---|---|
| 5,164,711 | * 11/1992 | Tuel, Jr. ................................ | 340/701 |
| 5,315,694 | * 5/1994 | Kasano ................................. | 395/131 |
| 5,334,992 | * 8/1994 | Rochat et al. ........................ | 345/22 |
| 5,469,536 | * 11/1995 | Blank ................................... | 395/131 |
| 5,861,871 | * 1/1999 | Venable ............................... | 345/150 |

OTHER PUBLICATIONS

Microsoft Press, Computer Dictionary, Third Edition, 1997, Microsoft Corporation pp. 386–387.*

* cited by examiner

*Primary Examiner*—Matthew Luu
*Assistant Examiner*—G. F. Cunningham

(74) *Attorney, Agent, or Firm*—Conley, Rose & Tayon PC; Jeffrey C. Hood

(57) ABSTRACT

A system and method for dynamically substituting colors in graphic images. The color substitution method receives a color to be replaced within the graphic image (Cr) and a new color (Cn). The method also receives a hue variance % value, which indicates the degree of hue variance for which a color substitution is performed. The method then converts the color to be replaced (Cr) to hue, luminance and saturation components (Hr, Lr, Sr), and converts the new color (Cn) to hue, luminance and saturation components (Hn, Ln, Sn). The method also computes a luminance difference Ld=Ln–Lr. Then, for each color element, e.g., each pixel or color command, the method performs a color substitution operation to replace one or more current colors in the graphic image with the new color. The color substitution operation for each color element compares the hue component Hc of the current color (Cc) of a current pixel in the graphic image and determines if Hc matches Hr within the specified hue variance. The method maintains the current color of the current color element unchanged if Hc does not match Hr within the specified hue variance, since the color of the current color element is not sufficiently close to the color desired to be changed. If Hc matches Hr within the specified hue variance, then the method sets the value of Hc to the value of Hn and sets the value of Lc to Lc+Ld in response to determining that Hc matches Hr. After the values of Hc and Lc have been changed appropriately, the method converts the new Hc and Lc values and the Sc value, back to an rgb format to produce a new color for the current color element. This new color is then stored for the respective color element, thereby effecting a color substitution for the respective color element.

13 Claims, 13 Drawing Sheets

(5 of 13 Drawing Sheet(s) Filed in Color)

Computer System

```
Step 310 - Automatically
change from one or
more current colors to new
color
```

```
Receive color to be
replaced (Cr) and new
color (Cn) in rgb format
402
```

```
Convert Cr to Hr, Lr, and
Sr; and convert Cn to Hn,
Ln, and Sn
404
```

```
Compute luminance
difference (Ld) as Ln - Lr
406
```

```
For each pixel, perform
color substitution
408
```

Original Motor. Grayscale Metafile.

Figure 8

Replace Gray    With Red    Hue Variance
Motor is Red

Figure 9

Darker Red

Figure 10

The Original Picture

Figure 11

Replace Green with Yellow. The money is yellow. The green on the money matched within 2 percent of the green we selected.

Figure 12

Replace Orange (Man's skin color) with Yellow. Now he has yellow skin

Figure 13

Replace 100% of colors with Orange. All colors are orange.

Figure 14

Original Picture

SYSTEM AND METHOD FOR DYNAMICALLY SUBSTITUTING COLORS IN A GRAPHIC IMAGE

FIELD OF THE INVENTION

The present invention relates to software for adjusting colors for 2D and 3D graphic images, and more particularly to a software system which automatically and/or dynamically substitutes colors within a portion or all of a graphic image.

DESCRIPTION OF THE RELATED ART

In many instances it is desirable to selectively alter or substitute colors in a graphic image. For example, modern computer systems include graphical user interfaces which enable the user to easily and simply interface with a program or application. Graphical user interfaces are also used to allow users to model processes, including the simulation and/or control of real world or physical components. One example of where the computer system graphical user interface (GUI) is used to model a physical real world process is in the field of industrial automation. In the field of industrial automation, a user typically will create a graphical user interface or graphical model including graphic images or icons which represent real world components comprised in the process being modeled or controlled. For example, the user may create a user interface comprising one or more valves, pumps, transducers, etc. which represent real world valves, pumps and transducers being controlled by the program. The user can thus more easily monitor the status and operation of these real world elements utilizing the graphical user interface presented on the screen of the computer system.

Various application programs have been developed which allow users to easily create graphical user interfaces and graphical programs for controlling or modeling processes. Examples of development environments which are used to develop graphical user interfaces and/or programs for modeling or controlling real world devices are the LabVIEW and BridgeVIEW graphical development systems from National Instruments Corporation, as well as the Visual Basic and Visual C++ programming development environments from Microsoft Corporation, including tools such as the ComponentWorks program from National Instruments Corporation. These programs typically provide a palette of graphic images or icons which may be used to create a graphical user interface for controlling or modeling the real world system. Also, where the program is a "container", various types of graphic image components may be included in the container.

In many instances, the user desires to alter the colors of one or more graphic images or icons displayed on the graphical user interface for aesthetic reasons or for functionality reasons. Also, the user may create a program which models or controls a process, wherein the program is designed to programmatically change the colors of one or more of the graphics images to indicate conditions occurring within the system. For example, if a tank overflows in the system, the program may programmatically change the color of the tank in the graphical user interface from green to red to visually indicate to the user that a problem has occurred. In a similar manner, in various instances it is desirable to programmatically change the colors of various graphic images or icons to provide visual indications to the user as to the status of operations or to indicate certain events which have occurred in the system.

In some cases where the graphic or bitmap image includes a plurality of different colors, it is often times desirable for the user to be able to manually or programmatically change the color of only a certain color of a graphic image, without affecting the other colors comprised in the graphic. It is also desirable to be able to change one or more colors, while maintaining the proper shading and lighting characteristics of the respective color. Therefore, an improved system and method is desired for automatically and/or dynamically substituting colors within graphic or bitmapped images.

SUMMARY OF THE INVENTION

The present invention comprises a system and method for dynamically substituting colors in graphic images. The present invention preferably operates in a computer system, wherein the computer system includes a CPU, a memory, and a display screen. The computer memory includes one or more graphic images, and also includes a software method for substituting colors according to the present invention. In the preferred embodiment, each graphic image comprises a re-usable software component, wherein the component includes the graphic image, the color substitution method and a property page or other means for configuring properties or attributes of the component. The property page is preferably used to configure the color substitution method to substitute one or more colors in the graphic image.

The color substitution method operates by first receiving user input specifying the color to be replaced within the graphic image (Cr) and a new color (Cn). The method also receives a hue variance % value, which indicates the degree of hue variance for which a color substitution is performed. The method then converts the color to be replaced (Cr) to hue, luminance and saturation components (Hr, Lr, Sr), and converts the new color (Cn) to hue, luminance and saturation components (Hn, Ln, Sn). The method also computes a luminance difference Ld=Ln−Lr.

Then, for each color element, e.g., each pixel or color command, the method performs a color substitution operation to replace one or more current colors in the graphic image with the new color. The color substitution operation for each color element comprises first obtaining a current color (Cc) of a current color element in the graphic image and converting the current color (Cc) to hue, luminance and saturation components (Hc, Lc, Sc). The method then determines if Hc matches Hr within the specified hue variance, i.e., if the hue value of the current color element matches the hue component of the color which is to be replaced within the specified hue variance. The method maintains the current color of the current color element unchanged if Hc does not match Hr within the specified hue variance, since the color of the current color element is not sufficiently close to the color desired to be changed.

If Hc matches Hr within the specified hue variance, i.e., the color of the current color element is sufficiently close to the color desired to be changed, thus warranting a color substitution, then the following steps are performed. First, the method sets the value of Hc to the value of Hn and sets the value of Lc to Lc+Ld in response to determining that Hc matches Hr. After the values of Hc and Lc have been changed appropriately, the method converts the new Hc and Lc values and the Sc value, back to an rgb format to produce a new color for the current color element. This new color is then stored for the respective color element, thereby effecting a color substitution for the respective color element.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

A better understanding of the present invention can be obtained when the following detailed description of the preferred embodiment is considered in conjunction with the following drawings, in which.

DETAILED DESCRIPTION OF THE PREFERRED EMBODIMENT

Computer System

Figure 1:
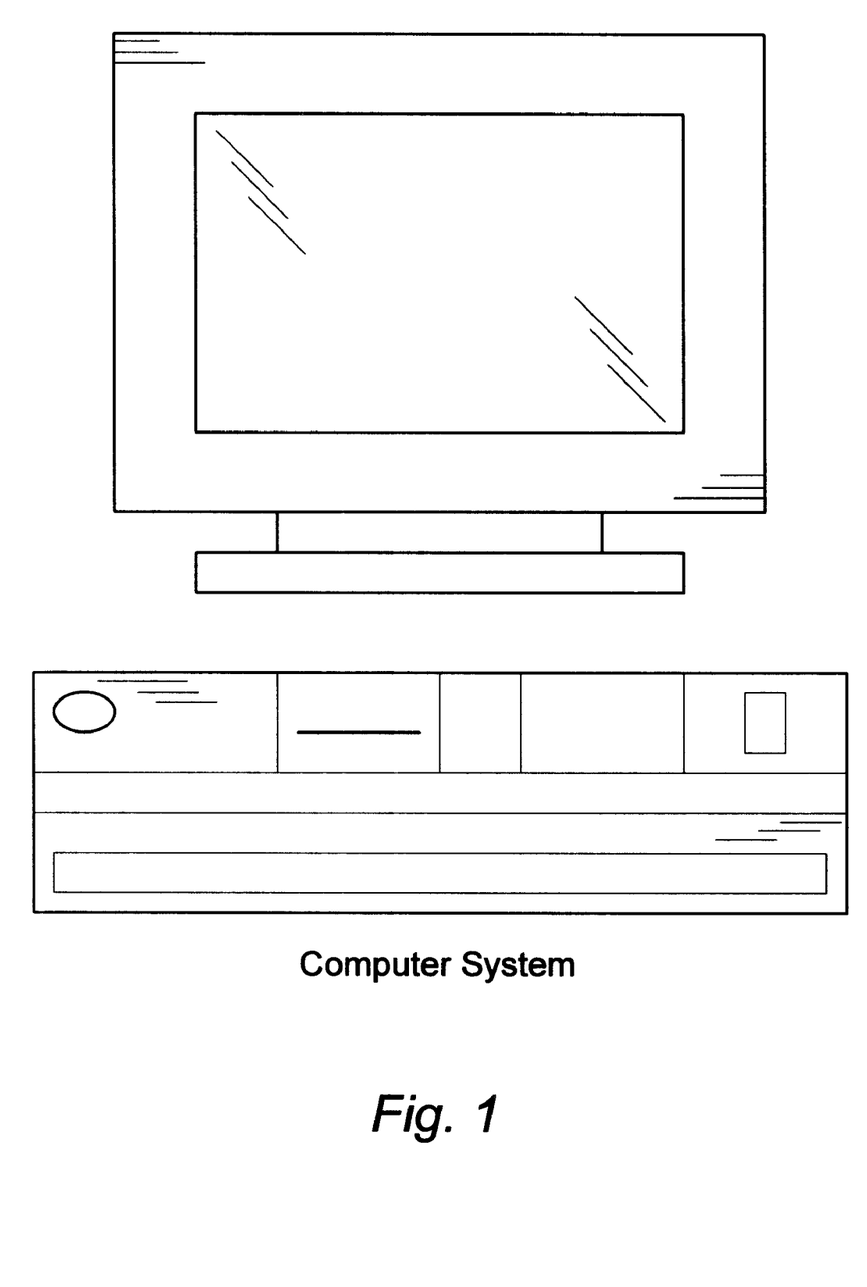
FIG. 1 illustrates a computer system including a color substitution method according to the present invention.

Referring now to FIG. 1, an illustrative computer system 102 according to the present invention is shown. The computer system 102 includes various standard elements, including at least one central processing unit (CPU), memory, a hard drive, one or more buses, and a power supply. The computer 102 preferably includes an installation media, e.g., CD-ROM, tape drive, or floppy disks 110, on which computer programs according to the present invention are stored. The host computer 102 also preferably includes a non-volatile media, such as a magnetic media, e.g., a hard drive, or optical storage, as well as system memory, such as DRAM, SRAM etc. The software programs of the present invention are also stored in the system memory and/or non-volatile memory of the computer 102 and executed by the CPU. The CPU executing code and data from the memory thus comprises a means or step for substituting colors in a graphic image according to the description below.

The computer system 102 stores various graphic images which each include one or more colors. One or more of the graphic images include a plurality of colors. In the present disclosure, the term "graphic image" refers to an image, icon or picture stored in a computer memory, wherein the image may have one or more colors. The term "graphic image" is intended to include bit-map images, vector images, metafiles, JPEG images, among others.

The computer system memory stores software according to the present invention which operates to substitute colors based on user input. In the preferred embodiment, the computer system 102 is operable to substitute colors based on manual user input, and is also operable to programmatically substitute colors, i.e., substitute colors in response to program execution. The present invention includes a novel system and method for substituting colors in the graphic image, wherein the lighting and shading are maintained, and wherein other colors comprised in the graphic image are selectively or optionally not affected.

Figure 2A:
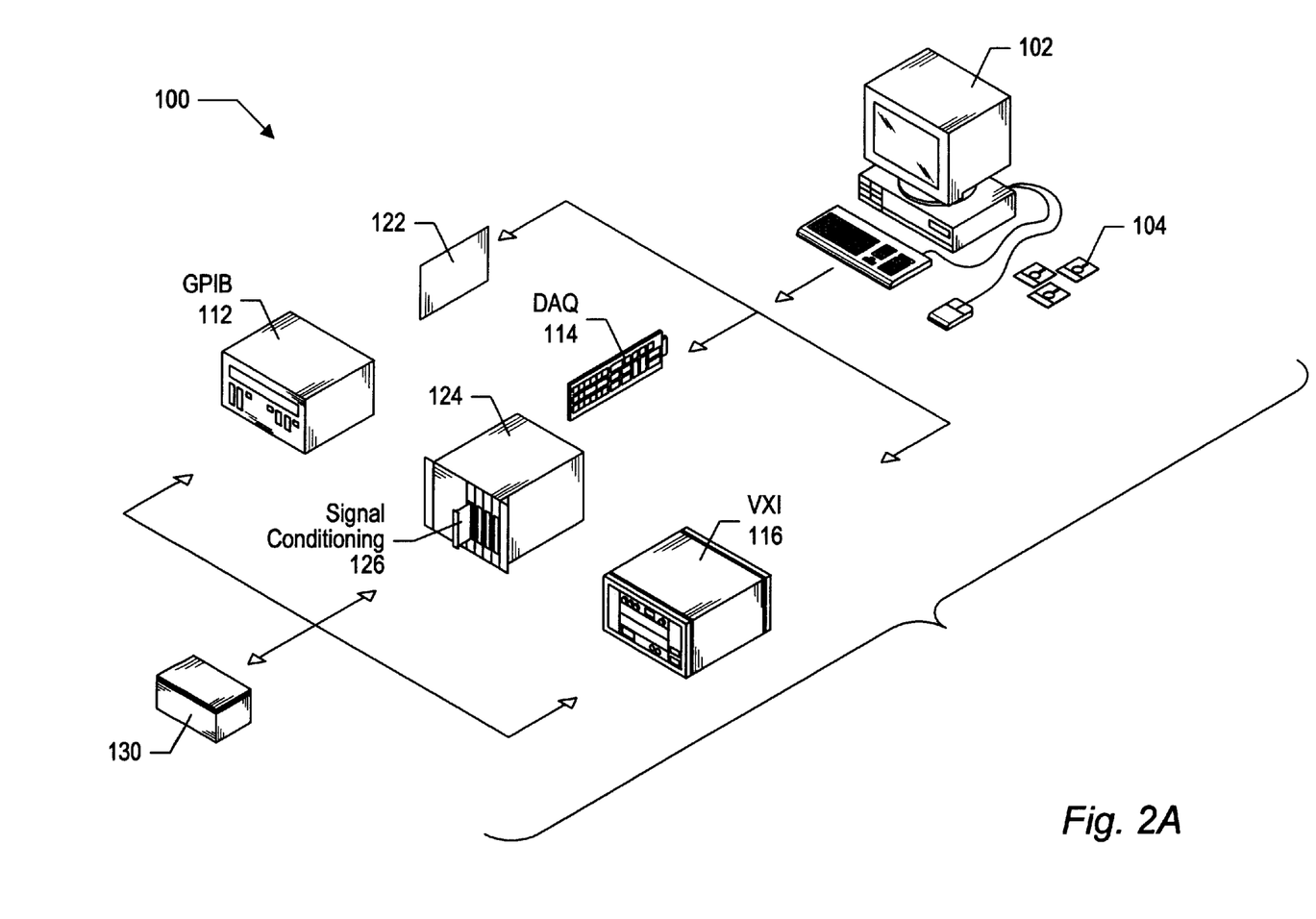
FIGS. 2A and 2B are block diagrams of measurement or industrial automation systems including the computer system of FIG. 1.
Figure 2B:
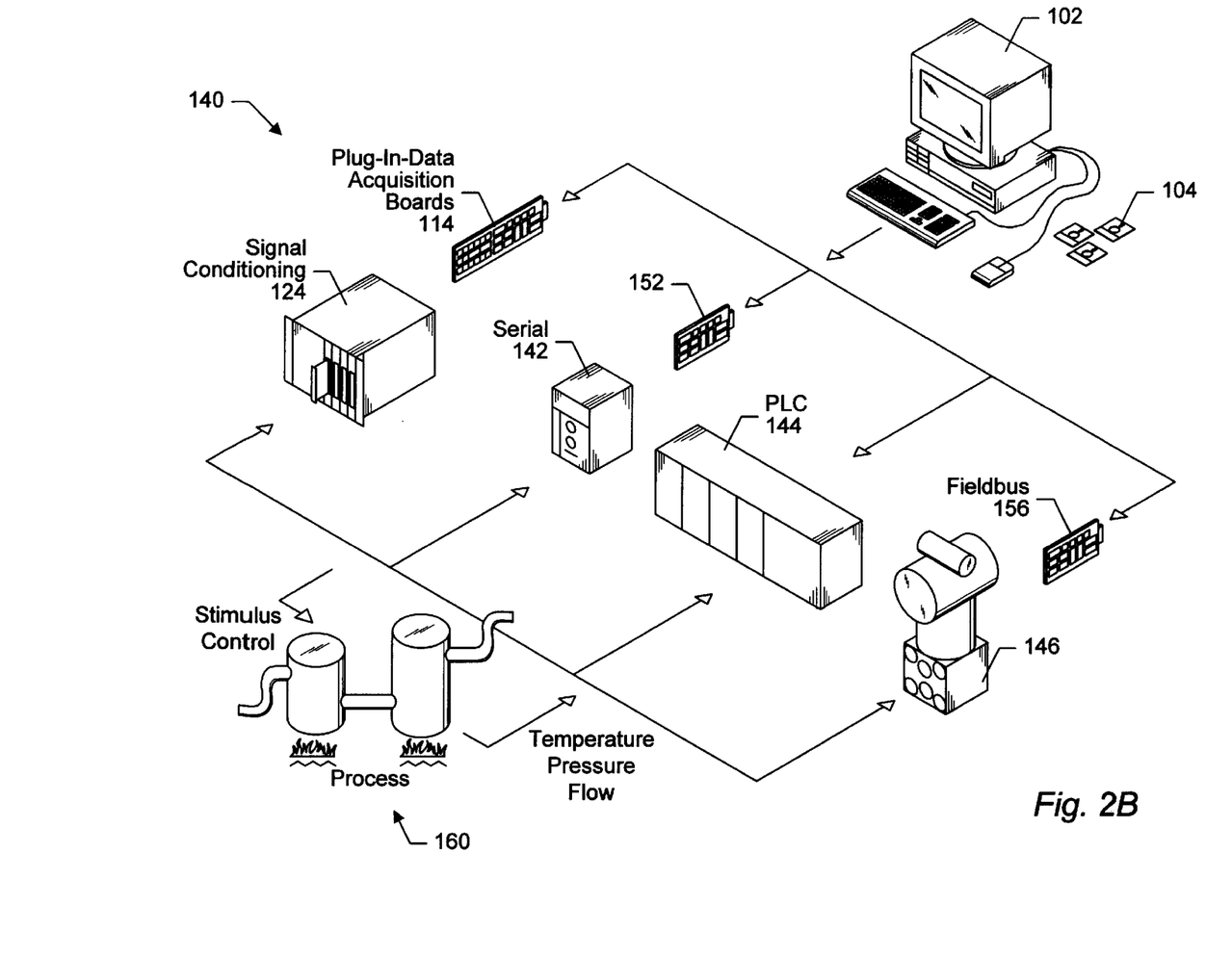

FIGS. 2A and 2B—Instrumentation and Industrial Automation Systems

In one embodiment, the computer 102 interfaces to an external or physical system, and the computer system stores graphic images which are used to model and/or control elements or devices comprised in the external system. FIGS. 2A and 2B describe two exemplary embodiments where the color substitution system and method of the present invention may be used.

Referring now to FIG. 2A, an instrumentation control system 100 is shown. The system 100 comprises the computer 102 which connects to one or more instruments. The computer 102 comprises a CPU, a display screen, memory, and one or more input devices such as a mouse or keyboard as shown. The computer 102 connects through the one or more instruments to analyze, measure or control a unit under test (UUT) or process 130.

The one or more instruments may include a GPIB instrument 112, a data acquisition board 114, and/or a VXI instrument 116. The GPIB instrument 112 is coupled to the computer 102 via a GPIB interface card 122 provided by the computer 102. The data acquisition board 114 is coupled to the computer 102, and preferably interfaces through signal conditioning circuitry 124 to the UUT. The signal conditioning circuitry 124 preferably comprises an SCXI (Signal Conditioning extensions for Instrumentation) chassis comprising one or more SCXI modules 126. Both the GPIB card 122 and the DAQ card 114 are typically plugged in to an I/O slot in the computer 102, such as a PCI bus slot, a PC Card slot, or an ISA, EISA or MicroChannel bus slot provided by the computer 102. However, these cards 122 and 114 are shown external to computer 102 for illustrative purposes. The VXI instrument 116 is coupled to the computer 102 via a VXI bus, MXI bus, or other serial or parallel bus provided by the computer 102. The computer 102 preferably includes VXI interface logic, such as a MXI or GPIB interface card (not shown) comprised in the computer. A serial instrument (not shown) may also be coupled to the computer 102 through a serial port, such as an RS-232 port, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 130, or are coupled to receive field signals, typically generated by transducers. The system 100 may be used in a data acquisition and control application, in a test and measurement application, a process control application, or a man-machine interface application.

Referring now to FIG. 2B, an industrial automation system 140 is shown. The industrial automation system 140 is similar to the instrumentation or test and measurement system 100 shown in FIG. 1. Elements which are similar or identical to elements in FIG. 1 have the same reference numerals for convenience. The system 140 comprises the computer 102 which connects to one or more devices or instruments. The computer 102 comprises a CPU, a display screen, memory, and one or more input devices such as a mouse or keyboard as shown. The computer 102 connects through the one or more devices to a process or device 160 to perform an automation function, such as MMI (Man Machine Interface), SCADA (Supervisory Control and Data Acquisition), portable or distributed acquisition, advanced analysis, or control.

The one or more devices may include a data acquisition board 114, a serial instrument 142, a PLC (Programmable Logic Controller) 144, or a fieldbus network card 156. The data acquisition board 114 is coupled to or comprised in the computer 102, and preferably interfaces through signal conditioning circuitry 124 to the process 160. The signal conditioning circuitry 124 preferably comprises an SCXI (Signal Conditioning extensions for Instrumentation) chassis comprising one or more SCXI modules 126. The serial instrument 142 is coupled to the computer 102 through a serial interface card 152, or through a serial port, such as an RS-232 port, provided by the computer 102. The PLC 144 couples to the computer 102 through a serial port, Ethernet port, or other proprietary interface. The fieldbus interface card 156 is preferably comprised in the computer 102 and interfaces through a fieldbus network to one or more fieldbus devices, such as valve 146. Each of the DAQ card 114, the serial card 152 and the fieldbus card 156 are typically plugged in to an I/O slot in the computer 102 as described above. However, these cards 114, 152 and 156 are shown external to computer 102 for illustrative purposes. In typical industrial automation systems a device will not be present of each interface type, and in fact many systems may only have one or more devices of a single interface type, such as only PLCs. The devices are coupled to the device or process 160.

The instruments or devices in FIGS. 2A and 2B are controlled or modeled by graphic images which are stored in the computer 102. The graphic images may be included in a program, such as a graphical program, which executes on the computer 102. During program execution, the graphic images are used to model and/or control their corresponding real-world elements. In the present disclosure, graphical software programs which perform data acquisition, analysis and/or presentation, e.g., for instrumentation control or industrial automation, are also referred to as virtual instruments. In the preferred embodiment, the graphical code generation system and method is comprised in the LabVIEW or BridgeVIEW graphical programming systems, or in the ComponentWorks program, all of which are available from National Instruments.

In the preferred embodiment, each graphic image comprises a re-usable software component, also referred to as a control, wherein the component includes the graphic image, the color substitution method and a property page or other means for configuring properties or attributes of the component. The property page is preferably used to configure the color substitution method to substitute one or more colors in the graphic image. It is noted that the component may include one or more separately adjustable graphic images. In an alternate embodiment, the color substitution method comprises a separate software program which is used to adjust or substitute colors in various graphic images.

Although in the preferred embodiment the color substitution system and method is comprised in a program involved with data acquisition/generation, analysis, and/or display, and for controlling or modeling instrumentation or industrial automation hardware, it is noted that the present invention can be used to perform substitution of colors for a plethora of software applications and is not limited to instrumentation or industrial automation applications. Thus, the system and method of the present invention is operable for substituting colors in graphics images for any of various types of applications, including general purpose software applications such as desktop publishing, image capture or archival, games, etc. Thus, FIGS. 2A and 2B are exemplary only, and the present invention may be used in any of various types of systems.

Figure 3:
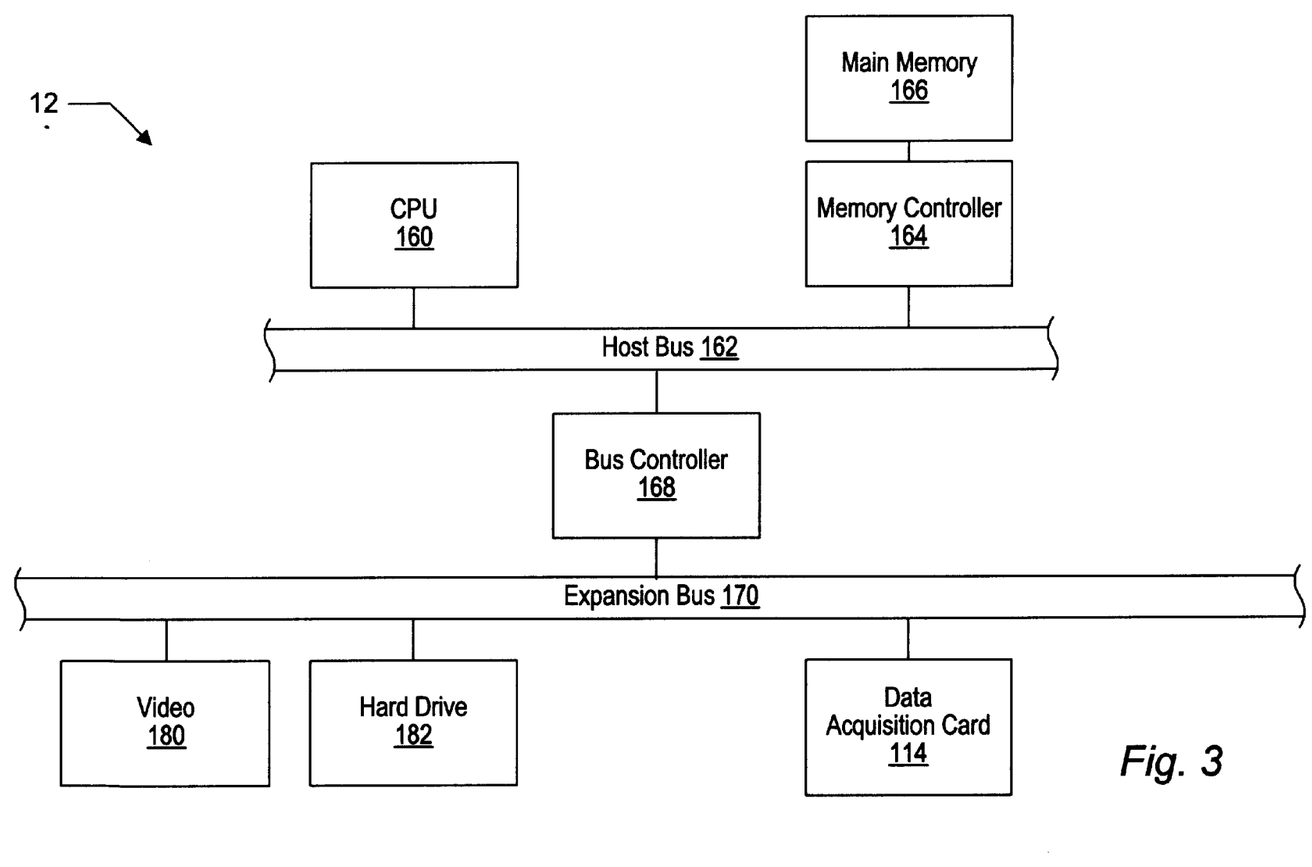
FIG. 3 is a block diagram of the computer system of FIG. 1.

FIG. 3—Computer System Block Diagram

Referring now to FIG. 3, a block diagram of the computer system 102 illustrated in FIGS. 1, 2A and 2B is shown. It is noted that any type of computer system configuration or architecture can be used as desired, and FIG. 3 illustrates a representative PC embodiment. It is also noted that the computer system may be a general purpose computer system as shown in FIG. 1, a computer implemented on a VXI card installed in a VXI chassis, a computer implemented on a PXI card installed in a PXI chassis, or other types of embodiments. The elements of a computer not necessary to understand the operation of the present invention have been omitted for simplicity The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores a component development system and software components or objects and associated software according to the present invention. The main memory 166 may also store DAQ software and various other software. The main memory 166 also stores operating system software as well as the software for operation of the computer system, as well known to those skilled in the art. The component software will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114, GPIB card 122, etc. The computer 102 further comprises a video display subsystem 180 and hard drive 182 coupled to the expansion bus 170.

Figure 4:
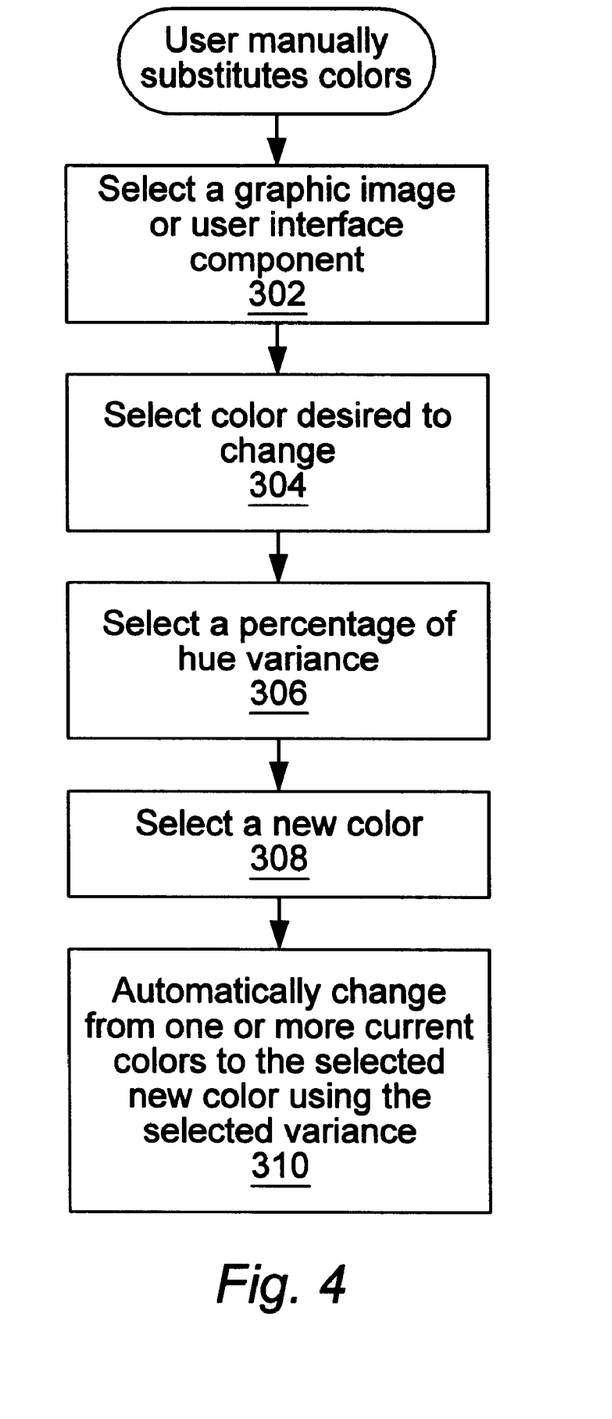
FIG. 4 is a flowchart diagram illustrating operation when the user manually substitutes colors in a graphic image.
Figure 5:
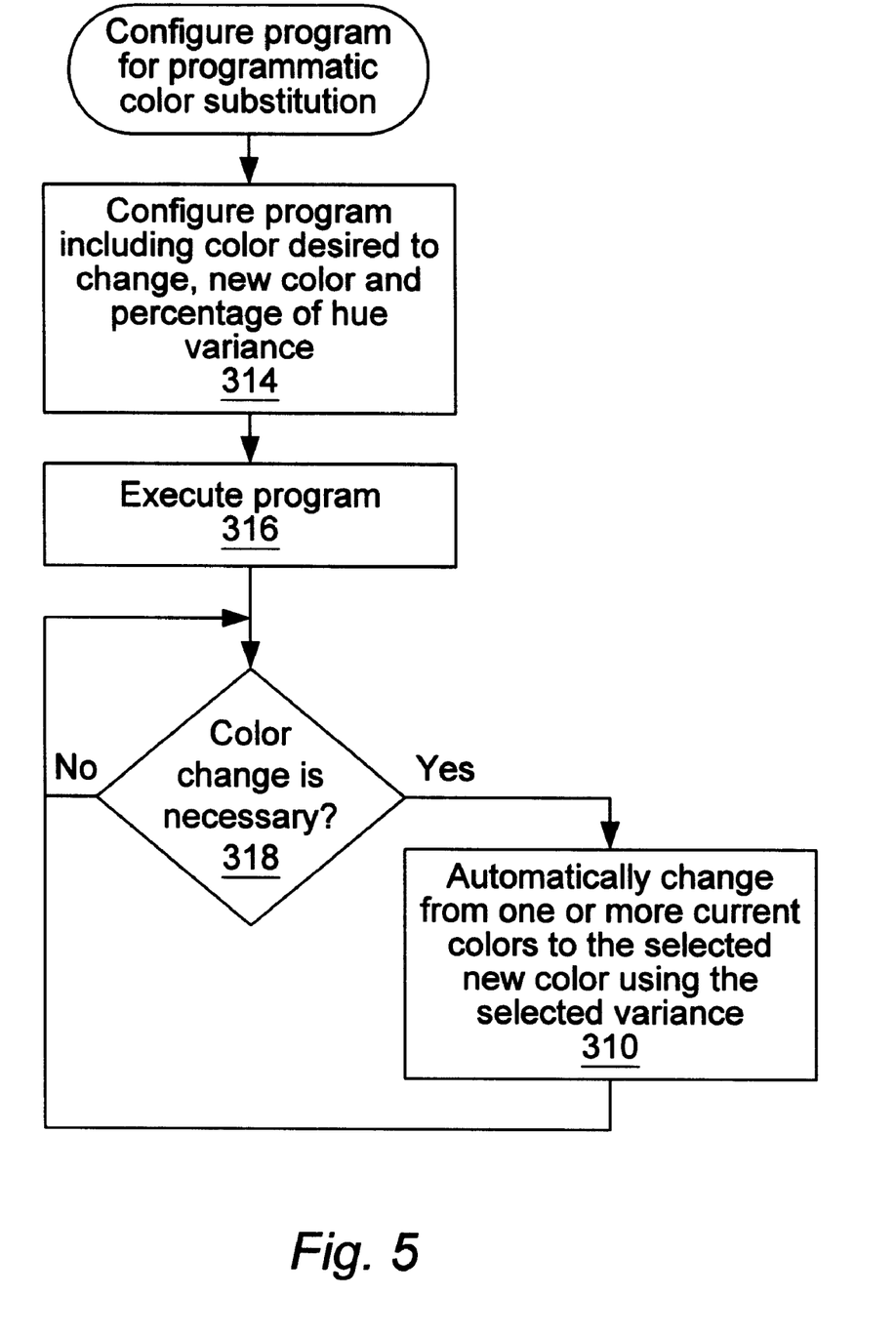
FIG. 5 is a flowchart diagram illustrating operation when a program is configured for programmatic color substitution.

FIGS. 4 and 5—Flowchart Diagrams

FIGS. 4 and 5 are flowchart diagrams illustrating use of the present invention. FIG. 4 is a flowchart diagram illustrating operation when a user manually substitutes a color with a new color. FIG. 5 is a flowchart diagram illustrating operation whereby a user configures a program to programmatically change a color to a new color, and the color substitution is performed during execution of the program.

As shown in FIG. 4, in step 302 the user selects a graphic image for a color substitution or adjustment. The graphic image may be a picture, an icon or another type of user interface component. As discussed above, in the preferred embodiment the graphic image corresponds to a portion or all of the real world device or element being modeled or controlled. Also, as described above, the graphic image may comprise an image in a control, wherein the control comprises one or more images.

In step 304 the user selects the color in the graphic image which is desired to be changed. In step 306 the user optionally selects a percentage of hue variance which is desired. The percentage of hue variance corresponds to the amount of variance in color or hue for which changes are to be made. A small hue variance percentage generally means that only shades of the specified color will be changed. If the percentage of hue variance is selected to be 100%, then all colors will be changed to the new desired color. If the selected percentage of hue variance is chosen to be 0%, then none of the colors will be changed. In the preferred embodiment, if there is no user selection of a hue variance, a default hue variance is used. In the preferred embodiment, the default percentage of hue variance is 2%.

In step 308 the user selects a new color, i.e., the color that is being substituted for the color which is desired to be changed as selected in step 304. In step 310, in response to user input, the program automatically changes one or more current colors, i.e., one or more colors currently present in the graphic, to the selected new color using the default and/or selected variance. It is noted that one or more "current colors" in the graphic are replaced, since the "color desired to be changed" is not necessarily present in the graphic, and further various shades of the "color desired to be changed" will typically be replaced, depending on the hue variance. Also, if the hue variance value is relatively large, then colors in addition to the "color desired to be changed", i.e., colors which are close to the color being replaced, may be replaced. Thus, depending on the selected variance, and depending on the colors present in the graphic, no current colors may be changed, only shades of a single current color may be changed, or a plurality of current colors may be changed. It is noted that the hue variance value can vary based on the color desired to be replaced, e.g., some colors have a larger range of hues than others and thus may require a larger variance to replace all of the color within the graphic. Operation of step 310 is described further below with respect to FIGS. 6 and 7, and screen shot examples are discussed with reference to FIGS. 8–16.

FIG. 5 illustrates operation involving programmatic substitution of colors. As shown in FIG. 5, in step 314 the user configures or creates a software program. The software program is configured to programmatically cause a substitution or adjustment of colors based on data or events generated within or during execution of the program. Thus the program is preferably configured with one or more colors to be replaced, one or more new colors, and optionally a hue variance value. The program may also be configured to programmatically select one or more colors to be replaced and/or one or more new colors based on a desired criteria.

In step 316 the user begins execution of the program including the graphic image. As discussed above, the program has configured program code which operates to programmatically cause a substitution of colors based on data or events generated within or during execution of the program. In step 318, if the program determines that a color change is necessary during execution, then in step 310 software is invoked which operates to automatically change from a current color in the graphic to the selected new color. If the user has previously selected a percentage of hue variance in step 306, then this selected variance is used in step 310. As noted above, step 310 is described further below with respect to FIGS. 6 and 7.

Figure 6:
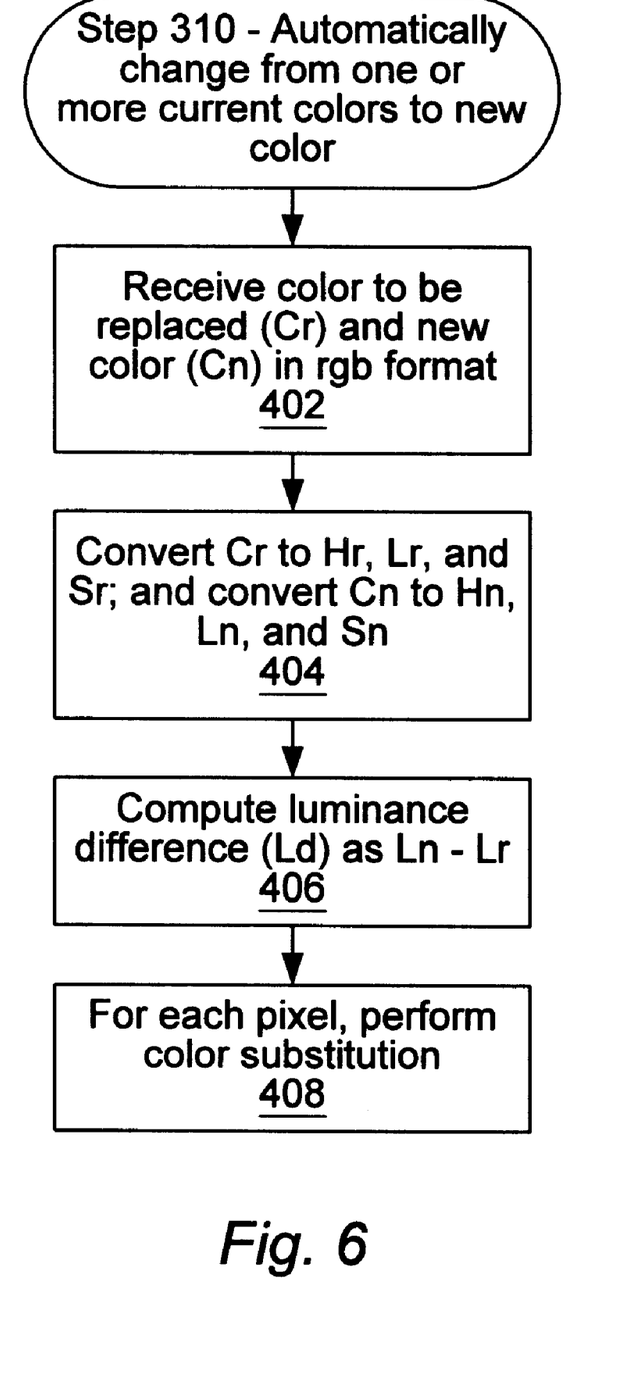
FIGS. 6 and 7 are flowchart diagrams illustrating operation of the method for substituting colors according to the present invention.
Figure 7:
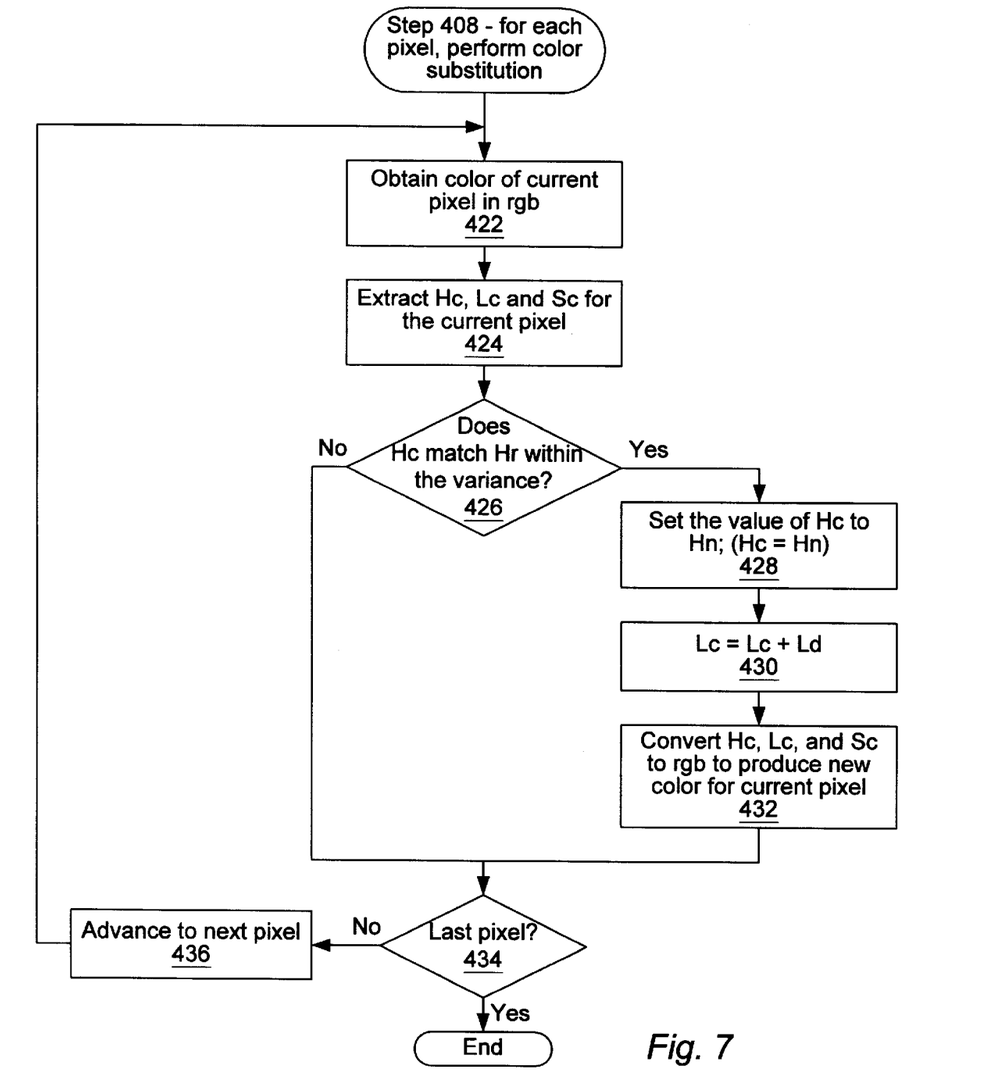

FIGS. 6 and 7—Changing from an Old Color to a New Color

FIGS. 6 and 7 are flowchart diagrams which illustrate operation of the color substitution method according to the preferred embodiment of the present invention. In the following description, the color to be replaced, also referred to as the old color, is referred to as Cr. The new color or the color being substituted for the color Cr is referred to as Cn. As is well known in the art, a color typically is comprised in rgb format, including red, green and blue components. The color of a current pixel being examined in the graphic image is referred to as Cc.

A color can also be extracted or converted into HLS components comprising hue, luminance and saturation components. Hue refers to the type of color, luminance refers to the brightness of the respective color, and saturation refers to the depth or shade of color. Thus, the color to be replaced (Cr) can be converted to HLS components comprising Hr, Lr and Sr. In a similar manner, the new color (Cn) can be converted to Hn, Ln and Sn components, and the current color of a current pixel can be converted to Hc, Lc, and Sc components.

As shown in FIG. 6, in step 402 the method receives the color to be replaced (Cr) and the new color (Cn) in rgb format. The Cr and Cn colors were specified by the user in steps 304 and 308, respectively. Alternatively, these colors were specified during program creation in step 314.

In step 404 the method converts the color to be replaced to Hr, Lr and Sr components, and converts the new color to Hn, Ln and Sn components. In step 404 the method may only compute the actual components needed such as only Hr and Hn, or only Hr, Lr, Hn, and Ln.

In step 406 the method preferably computes the luminance difference Ld as the difference between Ln and Lr. In other words, the method computes Ld=Ln−Lr. The luminance difference Ld is used during the actual color substitution to compute the luminance of the new color.

In step 408 the method performs a color substitution for each pixel and/or color command comprised in the graphic element. More particularly, in step 408 the method examines the current color of each pixel and/or color command and selectively performs a color substitution based on the current color and the hue variance value. Where a color substitution is performed for a respective pixel and/or color command, the newly computed color value is stored for the respective pixel and/or color command.

For graphic images which include pixels, e.g., bitmapped images, JPEG images, or GIF images, in step 408 the method examines each of the pixels in the graphic image and performs the color substitution for each pixel. For graphic images which are vector images, e.g., metafiles, in step 408 the method examines each of the color commands in the graphic image and performs the color substitution for each color command. In the present disclosure, the term "color element" is used to refer to pixels, color commands, and other elements which indicate color in a graphic image. Thus in step 408 the method examines each of the color elements in the graphic image and performs the color substitution for each color element.

FIG. 7 is a flowchart diagram which illustrates the operation of step 408 of FIG. 6. As shown, the flowchart of FIG. 7 is preferably performed for each color element, i.e., each pixel or color command, in the graphic image. In the preferred embodiment, the method begins with the color element in the upper left portion of the graphic element and proceeds in the positive X direction, from left to right, and from top to bottom in the Y direction, until the method has been performed for all color elements. The following description presumes that the graphic image includes pixels, i.e., the color elements are pixels. However, the method below operates in a similar manner for various types of color elements, including both pixels and color commands.

In step 422 the method obtains the color of the current pixel (Cc), wherein the color is in rgb format.

In step 424 the method abstracts the H, L and S components from the current color (Cc), referred to as Hc, Lc and Sc.

In step 426 the method determines whether the hue component of the current color (Hc) matches the hue component of the color to be replaced (Hr) within the variance specified by the user, or the default variance if none was selected. If Hc is determined to match Hr within the specified variance, then color substitution is performed in step 428–432, since the hue or color component of the current pixel matches the hue or color component of the color which is desired to be replaced within the specified or default percentage of variance.

If the hue component of the color of the current pixel does not match Hr within the specified or default variance as determined in step 426, then operation proceeds directly to step 434, and the color (Cc) of the current pixel being examined in step 422 is not changed. In this instance, the color (Cc) of the current pixel does not correspond closely enough to the color which is desired to be replaced (Cr), and thus the color remains unchanged.

If Hc is determined to match Hr within the specified variance in step 426, and thus color substitution is necessary, then in step 428 the method changes the value of Hc to the value of Hn. In other words, in step 428 the color or hue component value of the current pixel (Hc) is changed to the value of the hue component of the new color (Hn) in step 428. In step 430 the method changes the luminance component value of the current pixel (Lc) to be the luminance component value of the current pixel (Lc) plus the luminance difference value Ld. In other words, in step 430 the method computes Lc=Lc+Ld.

In step 432 the method converts Hc, Lc and Sc back to an rgb format, thus effectively computing the new color (Cn) for the current pixel being examined. In other words, In step 432 the method converts Hc, Lc and Sc to a color, using the newly computed Hc value in step 428 and the newly computed Lc value computed in step 430. This new color is then stored for the respective pixel.

After either of steps 426 or 432, the method determines if the current pixel being examined in step 422 is the last pixel in the graphic image. If so, then operation completes. If the current pixel being examined in step 422 is not the last pixel in the graphic image, then in step 436 the method advances to the next pixel, and operation returns to step 422, wherein the next pixel becomes the new current pixel. Thus, steps 422–432 are repeated for each of the respective pixels in the graphic image. As shown, the method operates to selectively perform a color substitution for each pixel based on the criteria input by the user.

FIGS. 8–16: Screen Shots

FIGS. 8–16 are screen shots illustrating operation of the present invention. FIGS. 8–16 each illustrate a component or control comprising a graphic image and the corresponding Property Page. FIGS. 8–16 thus each illustrate a graphic image, and FIGS. 8–16 also each illustrate the corresponding settings made to the Property Page which result in the respective graphic image shown in the figure.

As shown in each of FIGS. 8–16, the Property Page for each graphic image includes a lower color selection box which specifies the color to be replaced (Cr), an upper color selection box which specifies the new color (Cn), a color substitution (Clr Sub) check box, and a hue variance percentage value. It is noted that other Property Page formats or other user interfaces may be used to allow the user to input these values, as desired.

Figure 8:
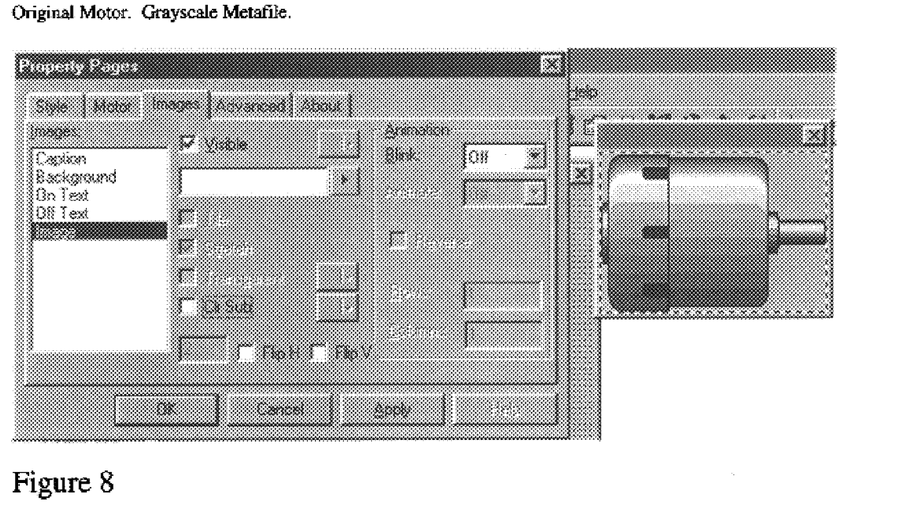
FIGS. 8–16 are screen shots illustrating operation of the present invention.

FIG. 8 illustrates a graphic image of a motor in a grayscale format. In other words, the control comprises a motor which is displayed as a gray scale metafile. FIG. 8 also illustrates the Images tab of the Property Page for the respective graphic image or control.

Figure 9:
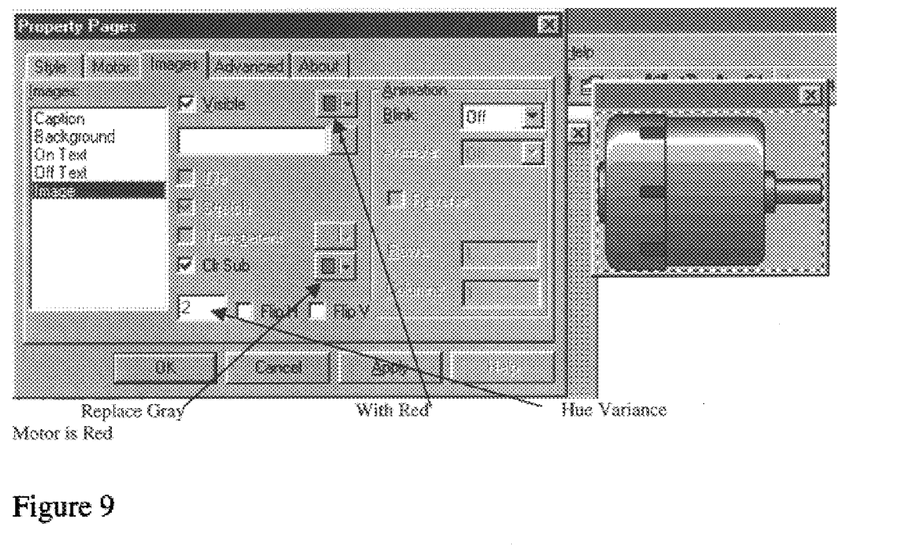

FIG. 9 illustrates the motor after a color substitution has been performed, wherein the motor has been changed to a red color. In order to perform this change, as shown in FIG. 9, the user has configured the Images tab of the Property Page to replace the gray color with a red color. As shown, the color substitution box (Clr Sub) has been checked, and the color red has been specified in the upper color selection box. The default hue variance of 2% has also been selected. When the user configures the property page as shown in FIG. 9, the motor is converted to the desired red color, as also shown in FIG. 9. As shown, the motor retains its shading and lighting characteristics.

Figure 10:
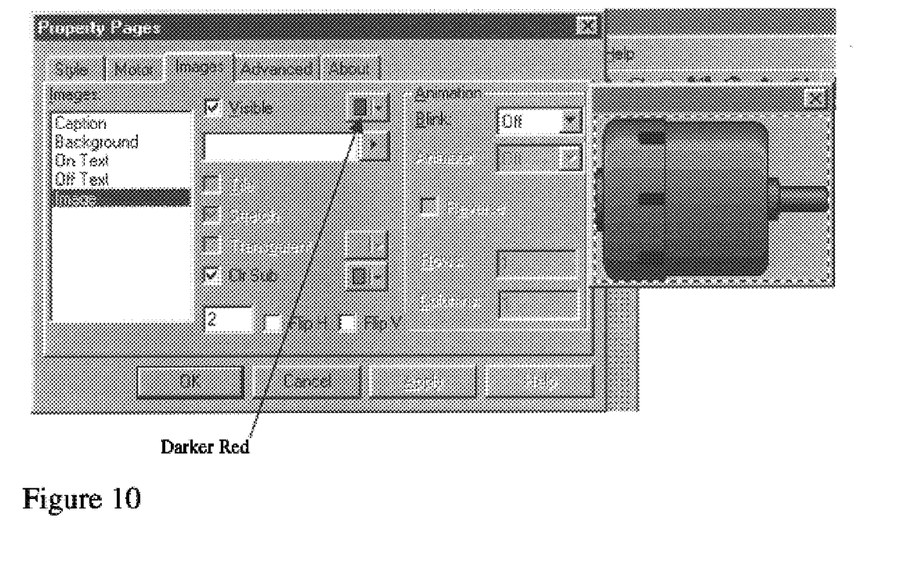

FIG. 10 illustrates the motor after a color substitution has been performed, wherein the motor has been changed to a darker red color. In order to perform this change, as shown in FIG. 10, the user has specified a darker color red in the upper color selection box.

Figure 11:
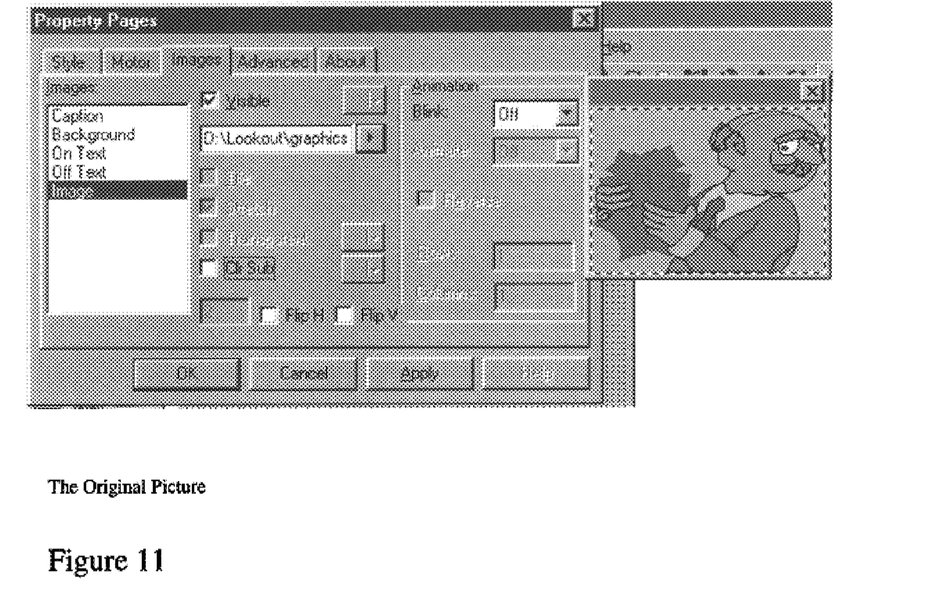

FIG. 11 illustrates an original picture or graphic image showing a man with a blue coat, a light blue colored handcuff, a light purple collar, a red tie, skin colored or orange-brown colored skin (face and hands), and holding green colored money.

Figure 12:
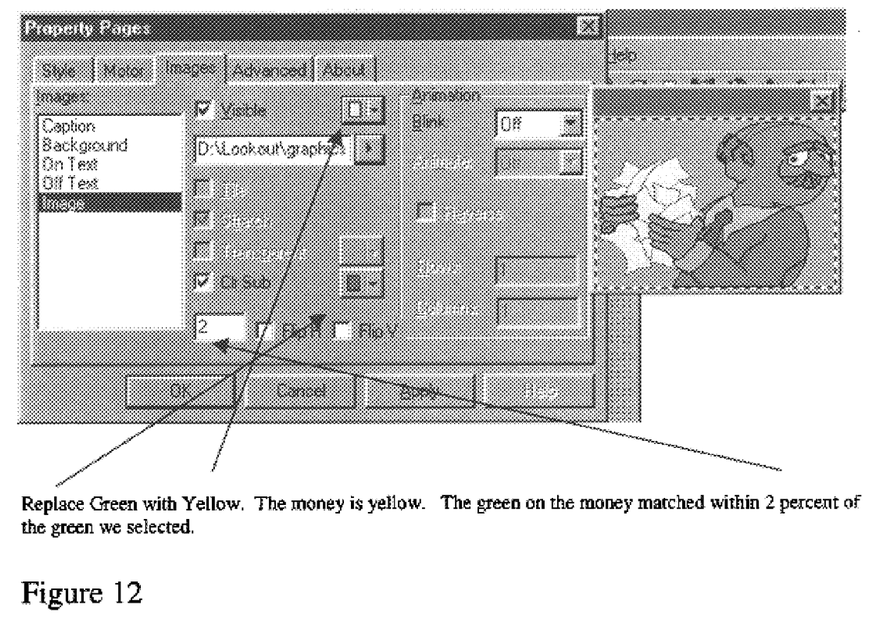

In FIG. 12, the user has configured the Images tab of the Property Page to replace the color green with the color yellow. As shown, the user has checked the color substitution box and has set the color green for the lower color input, which is the color to be replaced, and has configured the color yellow in the upper box, which represents the new color. As a result of this Property Page configuration, the green colored money has been changed to a yellow color. It is also noted that no other colors have changed within the graphic image, i.e., skin tone, reddish tie, dark bluish coat, light blue cuffs and light purple collar remain unchanged. The green of the money was changed because the screen color of the money matched within 2% of the green color (Cr) selected by the user on the Property Page. The other colors were unchanged because these other screen colors did not match within 2% of the green color (Cr) selected by the user on the Property Page.

Figure 13:
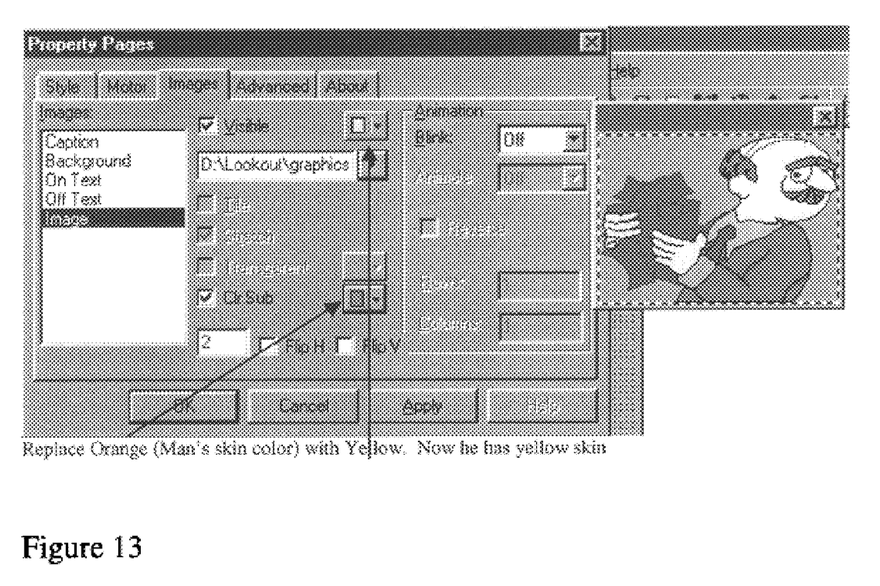

FIG. 13 illustrates the control changed with respect to FIG. 11, wherein the user has configured the Property Page to replace the orange color, which is the man's skin color, with yellow. As a result of this configuration, the skin color of the man shown in the graphic image has changed from the orange color to the yellow color. Here again it is noted that no other colors have changed within the graphic image with respect to FIG. 11, i.e., reddish tie, dark bluish coat, light blue cuffs, light purple collar, and green money remain unchanged. The skin color was changed because the screen color of the skin matched within 2% of the orange color (Cr) selected by the user on the Property Page. The other colors were unchanged because these other screen colors did not match within 2% of the orange color (Cr) selected by the user on the Property Page.

Figure 14:
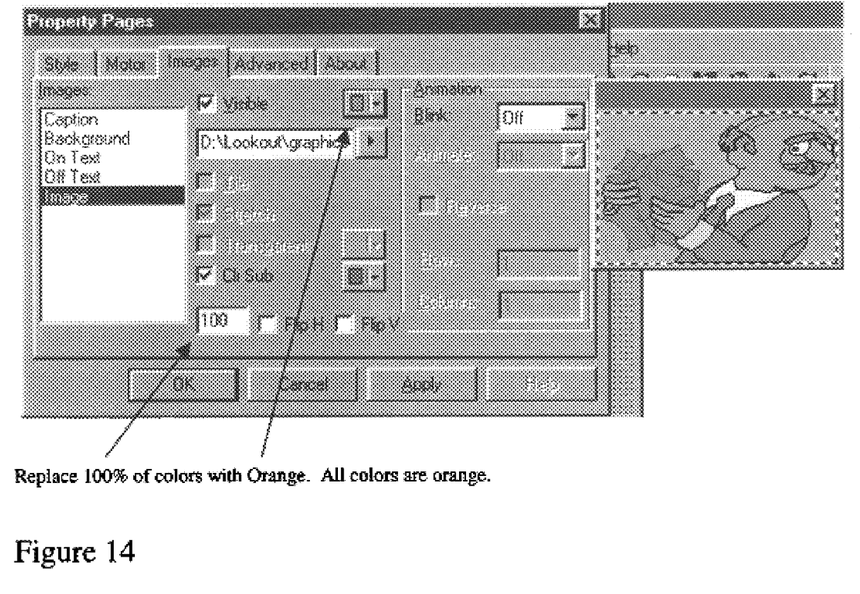

FIG. 14 illustrates the control changed with respect to FIG. 11, wherein the user has selected the new color to be orange and has selected the percentage of variance to be 100%. This 100% indicates that 100% of all colors will be replaced with the color orange. Thus, the resulting graphic image has all orange colors as shown.

Figure 15:
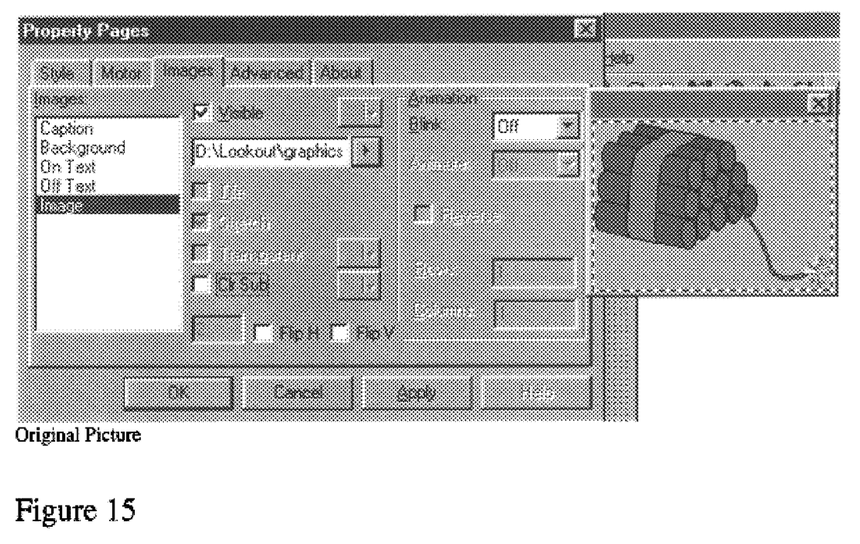

FIG. 15 illustrates a graphic image comprising red dynamite wrapped with an orange wrapper and a lighted fuse wherein the lighted fuse has yellow, orange and red components.

Figure 16:
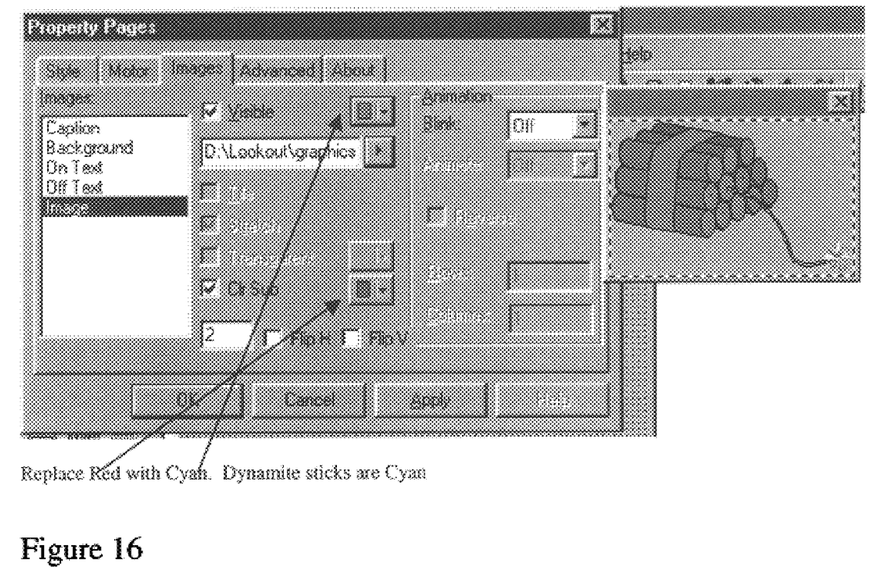

In FIG. 16, the user has configured the Property Page to change the color red to the color blue. More particularly, the user has selected red as the color to be replaced, has selected the color blue as the new color, and has selected a 2% hue variance. As shown, the resulting graphic image includes the red color dynamite being changed to blue dynamite, and the red components of the fuse being changed to blue components. The orange color wrapper around the dynamite has remained unchanged, and the yellow and orange components in the fuse remain unchanged.

Thus, the present invention is usable to substitute colors within a graphic image, wherein other colors are optionally unaffected by the color substitution. The present invention thus provides a more intelligent and user friendly method for configuring the colors of a graphic image. Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for substituting colors in a graphic image, wherein the graphic image includes one or more current colors, wherein the graphic image comprises a plurality of color elements, the method comprising:

receiving user input specifying the color to be replaced within the graphic image (Cr) and a new color (Cn);

converting the color to be replaced (Cr) to hue, luminance and saturation components (Hr, Lr, Sr);

converting the new color (Cn) to hue, luminance and saturation components (Hn, Ln, Sn);

receiving a hue variance value indicating a percentage of hue variance;

for each color element, performing a color substitution operation, wherein said performing said color substitution comprises:

obtaining a current color (Cc) of a current color element in the graphic image;

converting the current color (Cc) to hue, luminance and saturation components (Hc, Lc, Sc);

determining if Hc matches Hr within the specified hue variance value;

if Hc matches Hr within the specified hue variance value, then:

setting the value of Hc to the value of Hn;

converting Hc, Lc and Sc to an rgb format; and modifying the current color element according to the rgb format to produce a new color for the current color element.

2. The method of claim 1, wherein the current color of the current color element is unchanged if Hc does not match Hr within the specified hue variance value.

3. The method of claim 1, further comprising:

computing a luminance difference Ld=Ln−Lr;

wherein said performing color substitution further comprises:

setting the value of Lc to Lc+Ld in response to determining that Hc matches Hr within the specified hue variance value;

wherein said converting Hc, Lc and Sc to an rgb format is performed after said setting the value of Hc to the value of Hn and after said setting the value of Lc to Lc+Ld to produce the new color for the current color element.

4. The method of claim 1, wherein said performing the color substitution operation operates to maintain lighting and shading in said graphic image.

5. The method of claim 1, wherein one or more current colors comprised in the graphic image are not affected by said color substitution operation.

6. The method of claim 1, wherein the graphic image includes a first current color and a second current color;

wherein color elements having said first current color are affected by said color substitution operation;

wherein color elements having said second current color are not affected by said color substitution operation.

7. The method of claim 1, wherein said converting the color to be replaced (Cr) to hue, luminance and saturation components (Hr, Lr, Sr), said converting the new color (Cn) to hue, luminance and saturation components (Hn, Ln, Sn), and said performing said color substitution operation are performed in response to program execution.

8. The method of claim 1, wherein said graphic images comprises a plurality of pixels, wherein said color elements comprise pixels.

9. The method of claim 1, wherein said color elements comprise color commands.

10. The method of claim 1, further comprising:

displaying the graphic image prior to said performing the color substitution operation, wherein the graphic image includes said one or more current colors; and displaying the graphic image after said performing the color substitution operation, wherein said graphic image includes one or more updated colors in response to the color substitution operation.

11. The method of claim 1, wherein the graphic image is included in a software component with an associated property page for configuring properties of the component;

wherein the property page is operable to specify information affecting said color substitution operation.

12. The method of claim 11, wherein the property page includes:

a graphical user interface element for specifying the color to be replaced (Cr);

a graphical user interface element for specifying the new color (Cn); and a graphical user interface element for specifying a hue variance percentage value.

13. A method for substituting colors specified in a graphics metafile, wherein the graphics metafile includes a vector image comprising a plurality of color commands, the method comprising:

receiving user input specifying a color to be replaced within the vector image (Cr) and a new color (Cn);

converting the color to be replaced (Cr) to hue, luminance and saturation components (Hr, Lr, Sr);

converting the new color (Cn) to hue, luminance and saturation components (Hn, Ln, Sn);

receiving a hue variance value indicating a percentage of hue variance;

for each color command, performing a color substitution operation, wherein said performing said color substitution comprises:

obtaining a current color (Cc) of a current color command in the graphic image;

converting the current color (Cc) to hue, luminance and saturation components (Hc, Lc, Sc);

determining if Hc matches Hr within the specified hue variance value;

if Hc matches Hr within the specified hue variance value, then:

setting the value of Hc to the value of Hn;

converting Hc, Lc and Sc to an rgb format; and modifying the current color command according to the rgb format to produce a new color for the current color command.

* * * * *